May 9, 1967 R. TOBEY 3,318,545

WEB TRANSPORT SYSTEM

Filed Nov. 14, 1963 3 Sheets-Sheet 1

INVENTOR.
RICHARD TOBEY

BY Robert G. Clay

ATTORNEYS

INVENTOR.
RICHARD TOBEY
BY
Robert S. Clay
ATTORNEYS

INVENTOR.
RICHARD TOBEY
BY Robert G. Clay
ATTORNEYS

United States Patent Office 3,318,545

Patented May 9, 1967

3,318,545

WEB TRANSPORT SYSTEM

Richard Tobey, Los Angeles, Calif., assignor to Ampex Corporation, Redwood City, Calif., a corporation of California Filed Nov. 14, 1963, Ser. No. 323,760
27 Claims. (Cl. 242—55.12)

This invention relates to systems for transporting web material, and, more particularly to such a system embodying means for controlling the acceleration and deceleration of a tape which is required to be driven bi-directionally and at both high and low speeds.

Magnetic tape transport systems represent only one class of the many modern systems which must move a web of material at various speeds in both forward and reverse directions of travel. Many such systems require extremely rapid changes of speed, which requirement imposes severe mechanical stresses and strains on the web material. Because magnetic tape transport systems typify the extreme requirements which must be met, this invention will be described with specific reference to such systems, although such description is not to be construed as a limitation on the invention.

Digital tape transport systems are required to operate compatibly with associated high speed electronic data processing equipment. Basically, they must provide data to or accept data from the processing equipment at sufficiently high transfer rates to assure efficient operation of the data processing equipment. Intermittent operation must be begun without excessive delays. For the most part, modern tape transport systems fulfill this requirement. However, new requirements are continually being imposed on the transport systems, one of which is that they shall be able for some applications to provide very high speed tape advance in one or both directions for data search or tape rewind purposes.

Normally, when in a reading or writing mode of operation, magnetic tape is moved past the reading or writing head assembly at selected speeds of 25–150 inches per second, as determined by the desired data transfer rate. Of course, sudden starts and stops at such speeds are hard on the tape, and extreme care must be exercised to handle the tape gently to avoid stretching, catching or breaking the tape, while still guiding it in a precise path past the magnetic head assembly. As will be explained hereafter, this problem has been solved by providing a single, bi-directionally driven drive capstan. Discrepancies between the tape movement at the capstan and the relatively slower acting reels are compensated for by the use of intermediate buffer elements, such as vacuum chambers. The supply and take-up reels are usually servoed to the intermediate buffer mechanism so as to maintain the tape length in the buffer within a selected range. However, when the tape speed is suddenly sought to be changed from the normal speed to a high speed search or rewind rate five or more times greater, the buffer is not able to accommodate the necessary length of tape. At these much higher speeds the reel motor response is much slower, and proportionately much greater time intervals are required to reach the selected high speed. The usual design solution is to utilize much larger reel motors, and to separately or additionally employ more driving power. More often, the solution has been to utilize direct reel-to-reel transfer. In the former case much system versatility is lost, while in the latter data transfer is not possible.

In a typical magnetic tape transport system, two drive capstans are provided. The two capstans rotate continuously in opposite directions and pinch rollers are used to cause the magnetic tape to be driven by one or the other capstan as demanded by the associated data processing equipment. Tape speeds may be changed by belt, gear or other forms of drive, but unless the tape is driven reel-to-reel the rates of deceleration and acceleration are determined by the forces exerted on the tape by the drive capstan and associated pinch roller mechanism. For very high tape speeds, therefore, the response of the reel servos may be totally inadequate.

In newly improved systems, the magnetic tape is driven by a single drive capstan which rotates in both directions, under control of the associated data processing equipment. The tape is wrapped around the capstan with a large wrap-around angle (approximating 180° or more) in order to increase the frictional contact between the tape and capstan. This concept permits the capstan alone to be electronically controlled so as to vary the speed but the problem of coordinating tape speed with reel motor capability still remains.

Accordingly, it is a primary object of the present invention to provide means for preventing magnetic tape damage, when its speed of travel is markedly increased or decreased.

A further object is to provide a tape transport system which embodies tape drive control circuitry that is responsive to commands to change tape drive speed radically in amount relative to normal data transfer rates.

Another object of the invention is to provide a magnetic tape system having relatively simple means for achieving rewind and other high speed modes of operation as well as conventional modes of operation utilizing servo control.

Still a further object of the present invention is to provide an improved ramp generator circuit for use in the system of the present invention.

In accordance with the present invention, the foregoing problems are obviated by providing a tape transport system in which the rate of acceleration or deceleration of the tape is decreased, when the tape speed is accelerated to or decelerated from high speed, with respect to the rate of change for normal data transfer speeds. This is accomplished by using the high speed commands to vary the time constant of control circuitry that controls the capstan in a single capstan drive system. Thus the acceleration and deceleration characteristics of the capstan drive system are changed to correspond to the reel motor rates. Such variation is obtained automatically whenever the tape speed is changed between slow speeds or stop conditions to fast speeds so that a system may go through an extended sequence of tape speed changes, providing greater versatility.

Further objects, features and advantages of the invention will become apparent from the following description, taken in conjunction with the accompanying drawings, in which.

Figure 1:
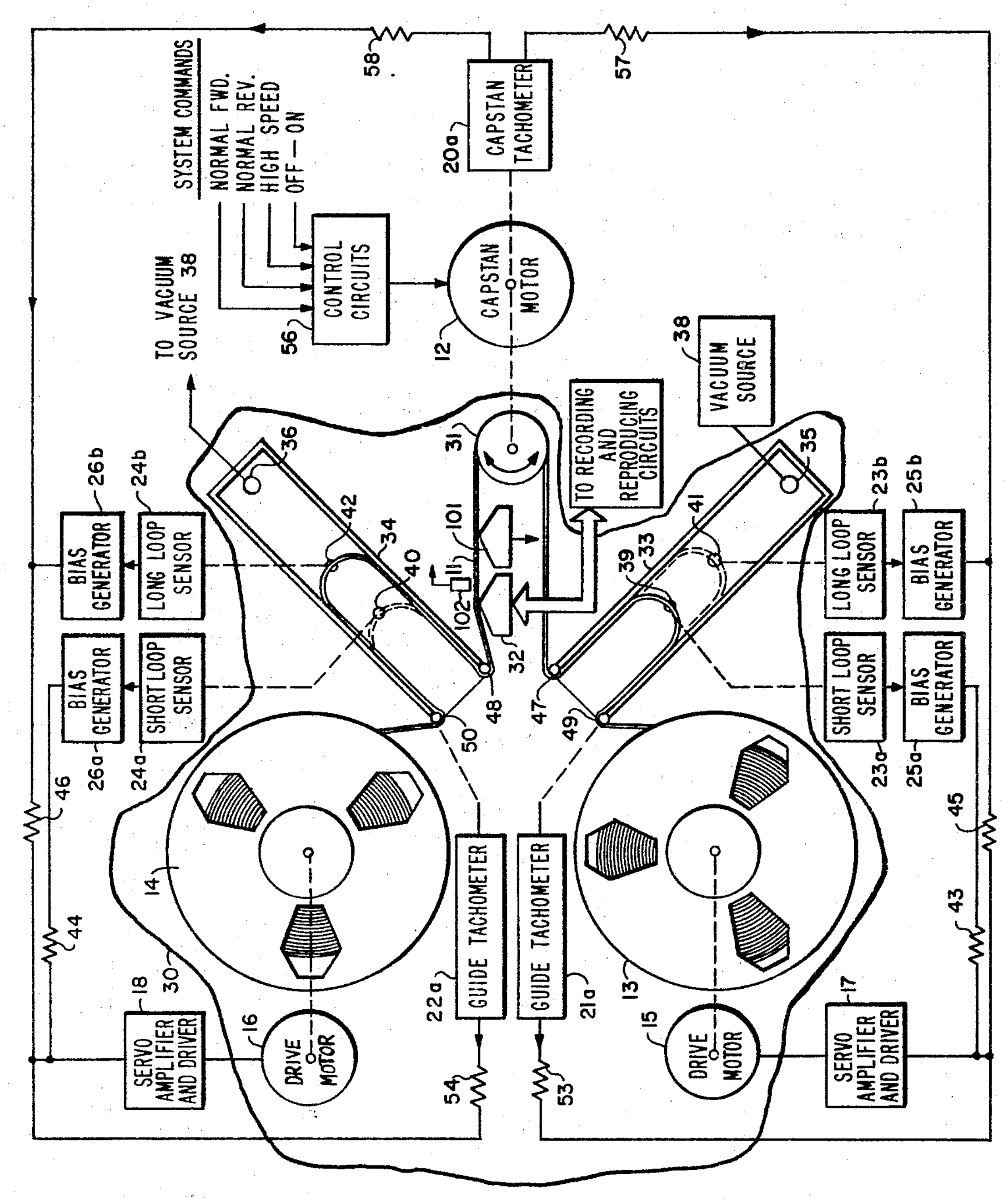
FIG. 1 is a simplified front view of a tape transport system and a block diagram of a system to which the invention is applicable.

FIG. 1 shows in partially detailed form a single drive capstan tape transport system of the type with which the invention is advantageously employed. The principal mechanically operative elements of the transport system are mounted on a front panel 30, shown only in fragmentary form. Other elements, which are not essential to an understanding of the present invention, have been omitted for the sake of simplicity, inasmuch as their provision and use will be understood by one skilled in the art.

As shown in FIG. 1, the tape 11 may be moved in either direction by a single drive capstan 31, along a controlled path between supply and take-up reels 13 and 14 past a magnetic head assembly 32, which is coupled electrically to the usual recording and reproducing circuits. In most tape drive mechanisms the tape reel motors 15 and 16 are mounted behind the front panel 30 and coupled directly to the reels, but they are shown (in block form in FIG. 1) as physically displaced for purposes of clarity.

Between the two reels 13 and 14, the tape path passes through a pair of low inertia differential pressure devices, such as vacuum chambers 33 and 34, symmetrically placed between the tape reels 13 and 14 and the drive capstan 31. The vacuum chambers 33, 34 may be of substantially constant and equal cross section and include vacuum inlets 35 and 36, respectively, at or adjacent to the closed ends and coupled to a vacum source 38. Loop position sensors providing additional input signals for the servos may take the form of short loop position sensors **23*a*, 24*a*, which are respectively connected to sensing holes 39 and 40, and long loop position sensors 23*b*, 24*b*, which are respectively connected to sensing holes 41 and 42. The short and long loop position sensors 23, 24 may be any of a number of conventional pressure sensitive devices, which detect changes in the pressure at the sensing holes 39–42** caused by the presence of the tape above or below the holes. Also, photoelectric or other types of sensors may be utilized, and the invention is not limited to any particular type of sensor.

The short and long loop sensors **23*a*, 23*b*, provide signals to bias generators 25*a*, 25*b*, respectively, which provide appropriate output signals through summing resistors 43 and 45, to the servo amplifier and driver 17 to cause it to energize the associated drive motor 15 to rotate the supply reel 13 at the correct speed and in the correct direction to maintain the loop in the chamber 33 at its optimum length for that direction of travel. By this is meant that the storage capacity of the chamber is used to the utmost in protecting against sudden reversal of tape direction. Similarly, bias generators 26*a* and 26*b* receive signals from the short and long loop sensors 24*a* and 24*b*, respectively, and provide bias signals through summing resistors 44 and 46 to the servo amplifier and driver 18 to cause the tape take-up reel 14 to rotate at the proper speed and in the proper direction to maintain the loop in the vacuum chamber 34** in is optimum position. Various other servo systems may be employed alternatively, as well known to those skilled in the art.

At the entry ends of the chambers 33, 34, here defined as the sides closest to the drive capstan 31, the tape passes over low friction guide rollers 47 and 48, respectively, which restrain the tape movement and cause the tape to follow the desired path into or out of the chambers 33 and 34. At the exit side of each vacuum chamber 33, 34, the tape passes over and rotates guide rollers 49 and 50, respectively. The guide rollers 49 and 50 are mechanically connected to drive guide tachometers **21*a* and 22*a*, respectively, which provide signals to the servo amplifiers and drivers 17 and 18, respectively, through summing resistors 53 and 54**, respectively, with the signals being proportional to the speed of the tape into or out of the vacuum chambers. The polarity of the signals indicates the direction of tape travel.

To understand the operation of the system as a whole, assume first that tape is being supplied from the supply reel 13 to the take-up reel 14, and that the drive capstan 31 is rotating in a counterclockwise direction. In that case, the capstan tachometer **20*a* and the guide tachometers provide output signals to the servo amplifiers and drivers 17 and 18 to cause the reel drive motors 15 and 16 to rotate the reels 13 and 14 in counterclockwise directions. The speeds slightly differ from the capstan speed, such that the loop in the vacuum chamber 33 shortens until it reaches the sensing holes 39, while simultaneously the other loop lengthens in the chamber 34 until it reaches the sensing hole 42. When the loop in the chamber 33 passes the sensing hole 39, the short loop sensor 23*a* provides a signal which causes the reel drive motor 15 to increase its speed of rotation enough to cause the loop to lengthen. Likewise, when the right tape loop moves across the sensing hole 42, the long loop sensor provides a signal to cause the right reel drive motor to speed up and tend to shorten the loop length in the vacuum chamber 34**. Thus the loops oscillate constantly at selected sensing holes for a given direction of tape movement.

In the preferred system of the invention, the drive capstan 31 has a highly frictional surface and may be slightly resilient. A rubber or rubber-coated element inherently provides those characteristics, and such an element is preferred. However, if desired, the capstan might be made of steel and the tape held against it by idlers under light pressure. As shown in FIG. 1, the tape wraps around the capstan with a large wrap-around angle, preferably approaching 180°, so that the greatest possible area of surface contact is provided between the tape and capstan, and the capstan exerts a uniform driving force across the tape under all operating conditions. With constant and balanced tape tensions and a high wrap-around angle, the tape is accelerated and decelerated in non-sliding relation to the drive capstan, the movement of which entirely determines the tape movement.

The system thus provides for cooperation of the various elements under widely varying speeds of operation by modification of the commands provided from the control circuits 56 to the capstan motor 12. Means are provided for varying the acceleration and deceleration rates when the tape speed is varied to or from normal (or slower) data transfer rates, or to or from high speed, without loss of control. When the tape is to be brought to a very high speed, for example, the energizing signal for the capstan motor 12 is changed such that a constant but lower acceleration rate is achieved at the capstan automatically. This is accomplished by the control circuitry 56, which receives the speed commands from the associated data processing equipment and converts them to suitable signals to energize the capstan drive motor 12.

Figure 2:
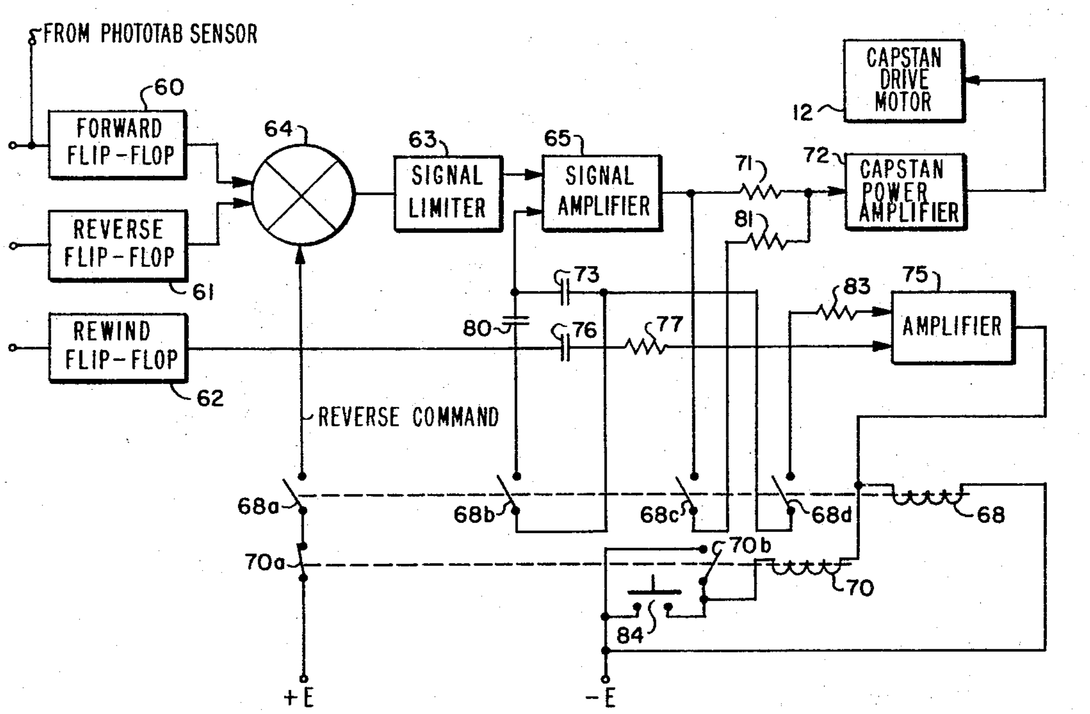
FIG. 2 is a combined block diagram and schematic diagram of one arrangement of control circuitry in accordance with the invention.

FIG. 2 illustrates, partially in block diagram form, the control circuitry in accordance with the invention for achieving high speed rewind of the tape. As shown, the control circuits 56 include forward and reverse flip-flops 60 and 61, respectively, for normal data transfer speeds, and a rewind flip-flop 62, respectively, for high speed rewind in the reverse direction. The forward and reverse flip-flops 60 and 61 provide direct current (D.C.) signals through a summing device 64 and a signal limiter 63 to an amplifier 65; the signals from the flip-flops 60 and 61 control the direction of rotation of the capstan drive motor 12 and hence are of opposite polarity. The flip-flop 62 is used to produce a pulse-like signal whose characteristics will be described hereinafter.

The summing device also receives a positive D.C. signal level from a source +E to provide a reverse command for rewind. This reverse command is provided to the summing device 64 through normally open contacts **68*a* of a relay having an actuating coil 68 and through normally closed contacts 70*a* of a relay having an actuating coil 70. It should be noted that the signals from the reverse flip-flop 61 and the source +E are of like positive polarity, but opposite that of the negative signal from the flip-flop 60. The signal limiter 63, which may be in the nature of a current limiting circuit, and the amplifier 65 cooperate to provide a ramp-shaped input signal through an output resistor 71 to a capstan power amplifier 72. The amplifier 72 powers the capstan drive motor 12 to produce a gradual controlled acceleration and deceleration of the capstan drive motor 12. An integrating capacitor 73 is coupled across the amplifier 65 to be charged or discharged gradually at a constant rate determined by the output of the signal limiter 63 until the final value of the ramp output is attained. Thus, the charging and discharging time constant of the ramp generating circuit determines the rate of acceleration and deceleration of the capstan drive motor 12**. A detailed description of a ramp generator circuit that might be employed to produce the desired ramp function output is disclosed in the previously filed U.S. patent application of Robert A. Kleist, Martyn A. Lewis and Ben C. Wang, Ser. No. 307,161, filed Sept. 6, 1963, and assigned to the assignee of the present invention. However, a detailed circuit diagram of an improved ramp generator circuit particularly suited to the system of this invention is described in connection with FIG. 4.

The rewind flip-flop 62 provides a negative output signal as one input to an implifier 75 through a series-connected capacitor 76 and resistor 77. The output of the amplifier 75 is connected to energize the relay coil 68 in response to the positive signal, with one end of the relay coil 68 being connected to the amplifier 75 and the other end of the coil being connected to a negative source of potential −E.

The actuation of the relay coil 68 closes four sets of normally open contacts designated as 68*a* through 68*d*. The contacts 68*b* serve when closed to connect an additional integrating capacitor 80 in parallel with the capacitor 73, and the contacts 68*c*, when closed, connect an additional resistor 81 in parallel with the resistor 71. When closed, the contacts 68*d* connect the output of the amplifier 65 as another input to the amplifier 75 through a resistor 83.

The relay coil 70 actuates a set of normally closed contacts 70*a* and a set of normally open contacts 70*b*. The relay coil 70 is connected in parallel with the relay coil 68 through its contacts 70*b*, and a manually-actuable, momentary contact switch 84 is connected across the contacts 70*b*, which serve as holding contacts.

To understand the operation of the control circuitry shown in FIG. 2, certain assumptions are made. It is assumed that all of the flip-flops are controlled in conventional fashion by data processing equipment (not shown) with which the tape transport system of the invention is operating. Also, the assumption is made that the forward and reverse flip-flops 60 and 61 provide D.C. signals having absolute magnitudes equal to the +E potential.

In the first situation to be described, it is further assumed that the apparatus is commanded by the data processing equipment to change from a non-operating condition to a normal speed forward drive operating condition. In that case, the forward flip-flop 60 provides a signal of the predetermined amplitude and negative polarity to cause the amplifier 65 to charge the capacitor 73 at a constant rate, thus accelerating the capstan in a forward direction at a proportional constant rate. Because of the gradual charging of the capacitor 73 by the constant current flow from the amplifier 65, a positive-going voltage appears at the output of amplifier 65, which causes input current to be applied to the capstan power amplifier 72. The capstan motor 12 is accelerated gradually in a controlled fashion, but, nevertheless, rather quickly, because the tape is being accelerated only from a stopped condition to the normal, relatively slower, data transfer speed (such as 75 inches per second).

Now, however, assume that the tape 11 is stationary with flip-flops turned off, and that the data processing equipment commands the tape transport to begin high speed rewind. When that occurs, the rewind flip-flop 62 is energized by the data processing equipment to provide a negative pulse to the amplifier 75. The positive output from the amplifier 75 then energizes the relay coil 68 to close the contacts 68*a*–68*d* of the relay. When the relay contacts 68*a* close, a positive D.C. signal is provided through the contacts 68*a* and 70*a* to the summing device 64 from the source of positive potential +E. In addition, closing of the relay contacts 68*b*, 68*c* and 68*d* connect the capacitor 80 in parallel with the capacitor 73, connect a resistor 81 in parallel with the resistor 71, and connect the output of the amplifier 65 to the input of the amplifier 75 through a resistor 83.

The signal applied to the amplifier 75 is in the form of a short duration pulse derived by the differentiating action of the capacitor 76 from the leading edge of the negative-going signal from the rewind flip-flop 62. However, the time constant of the capacitor 76 and resistor 77 is sufficiently long to permit the capacitors 73 and 80 to charge up to a sufficient extent to provide an input signal to the amplifier 75 through the contacts 68*d* to maintain the relay coil 68 energized. The acceleration time constant is greatly increased by connecting the additional integrating capacitor 80 in parallel with the feedback capacitor 73 when low-to-high speed operation is commanded.

It should be noted that when the capacitor 80 is connected, any existing charge on the capacitor 73 is immediately discharged to a lower voltage level to equalize potentials on the two. Accordingly, if a rewind command is given by the data processing equipment while the tape is moving at a normal speed, the tape is decelerated almost instantaneously to a low speed, nearly zero, and then starts acceleration in the reverse direction at the slower rate, all within the storage capacity of the loops. Subsequently, after the tape 11 has been accelerated a given degree in the reverse direction, the negative output from the amplifier 75 is sufficient to keep the relay contacts 68*a*–*d* closed until rewind is completed.

The higher final rewind speed of the tape 11 is achieved by the same final output voltage level from the amplifier 65 by virtue of the connection of the additional resistor 81 in parallel with the resistor 71. The lower resistance of the parallel circuit delivers a higher input current to the capstan power amplifier 72, even though the voltage output from amplifier 65 is the same as for lower speed operation.

If, when the system is operating in the high speed rewind mode, it is manually commanded to stop, the relay coil 70 is actuated to close the normally open contacts 70*b* and open the normally closed contacts 70*a*, thus removing the reverse command signal from the input of the amplifier 65. The contacts 70*b*, connected in parallel with the switch 84, serve as holding contacts to keep the relay coil 70 energized. However, the long charging time of the combination of the capacitors 73 and 80 still connected across the amplifier 65 causes the capstan drive motor 12 to decelerate at the slower of its two possible rates as the capacitors 73 and 80 discharge at a constant rate. When they have discharged sufficiently, the signal at the output of the amplifier 65 reaches a level that is insufficient to keep the relay coil 68 energized, at which time the relay contacts 68*a*–*d* open, thus disconnecting the capacitor 80 from the circuit and causing the drive motor 12 to decelerate at its more rapid rate until it finally stops.

When the rewinding of tape has been completed in the reverse direction at high speed, it may be caused to stop automatically and advance at normal speed to a desired point. Generally, at the forward end of the tape, the tape carries a tab which actuates a photo-sensor 102 when the tab passes it. The photo-sensor 102 then sends a signal to the forward flip-flop 60. The negative output signal from the forward flip-flop 60 neutralizes the positive reverse command signal from the +E source. Thus, the signal present at the output of the summing device 64 is then zero and the capacitors begin to discharge toward zero. As the capacitors 73 and 80 discharge, the input to the amplifier 75 reaches a level at which the relay coil 68 is de-energized so that the high speed reverse command signal is removed by opening of the relay contacts 68*a*, and the capacitor 80 is removed from the charging circuit. Removal of the high speed command signal results in the negative output signal from the forward flip-flop 60 appearing at the output of the summing circuit 64 to cause the tape 11 to accelerate to normal speed in the forward direction at the higher accelerational rate. The tape may then be stopped when the tab is again sensed by the photosensor by a pulse to turn off the forward flip-flop 60.

It is to be understood that the terms slow and fast acceleration and deceleration, as used herein, are only relative. In actual practice, acceleration to and deceleration from high speed operation may occur in a matter of tens of milliseconds.

Figure 3:
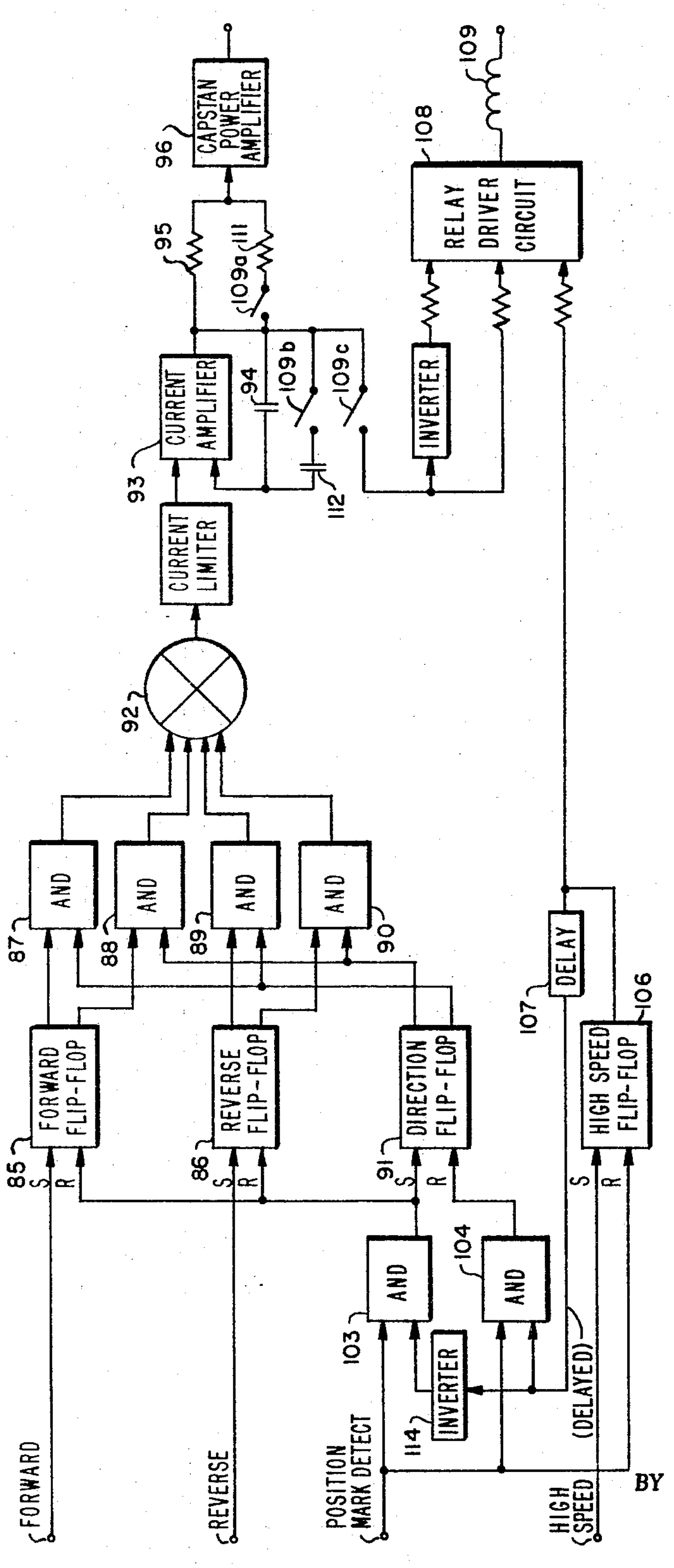
FIG. 3 is a block diagram of another control circuit arrangement in accordance with the invention.

Referring now to FIG. 3, there is shown different circuitry in accordance with the invention for achieving a high speed search mode of operation for the tape system in either direction. The logical arrangement shown herein mostly in block diagram form permits the system to operate automatically to carry out a search for a particular block of information in either direction at high speeds, and upon location of the information to automatically return to the lower reading speed in the forward direction to reproduce the information.

This circuit contains a forward flip-flop 85 and a reverse flip-flop 86 which provide complementary outputs to the inputs of an arrangement of AND gates 87, 88, 89 and 90. That is, when the set or reset output from the forward flip-flop 85 is in one state such as may be represented by a positive polarity output voltage, the corresponding output from the reverse flip-flop 86 is in the opposite state such as may be represented by a negative polarity output voltage.

Each of the AND gates 87–90, besides having one of its input terminals coupled to receive one of the set or reset outputs from the forward or reverse flip-flops 85 and 86, also receives enabling signals from the set and reset outputs of a direction flip-flop 91. The set output from the direction flip-flop 91 enables the AND gates 88 and 90 to pass the voltage levels appearing at the reset output terminals of the forward and reverse flip-flops 85 and 86, whereas the reset output from the direction flip-flop 91 enables the other two AND gates 87 and 89 to pass the voltage levels appearing at the set output terminals of the forward and reverse flip-flops 85 and 86. The voltage level passing through the AND gates 87–90 are connected to the summing junction 92. The summing junction 92 then provides an input signal to an amplifier 93 of a polarity indicative of the desired direction of capstan rotation. The amplifier 93 produces an output of one polarity or the other, but of a polarity opposite to that of the input, which is then used to charge an integrating circuit including the capacitor 94. Charging of the integrating circuit delivers a ramp-shaped output signal through a resistive circuit including the resistor 95 to the input of the capstan servo amplifier 96 in the manner previously described in connection with FIG. 2.

To accomplish the high speed search, the tape system of FIG. 1 is provided with a magnetic reading head 101 which is capable of detecting position marks or particular groups of information on the tape such as are commonly used to identify the location of a selected block of recorded data which is to be read. The position mark detect head 101 which may also perform the normal read function is designed in conventional fashion to provide a single output pulse at such time as the desired position mark passes beneath the head position. This output from the head 101 is delivered to the input terminal of a pair of AND gates 103 and 104 and also to the reset input terminal of a high speed flip-flop 106.

In initiating a high speed search, an appropriate forward or reverse input is applied from the data processor to the appropriate flip-flop 85 or 86 to place it in the set state. In addition, the high speed flip-flop 106 is placed in the set state by a high speed input signal so that an output signal is delivered from its set output terminal to a relay driver unit 108, which operates in the manner previously described in connection with FIG. 2, thereby actuating the relay coil 109 to close the various relay operated contacts 109*a*, 109*b* and 109*c* to thereby lower the acceleration of the system. Closing of the switch 109*a* connects resistor 111 in parallel with the resistor 95 between the output of amplifier 93 and the input to the capstan servo amplifier 96. Accordingly, a given voltage output from the amplifier 93 provides an increased current flow to the capstan servo amplifier 96, thereby resulting in a higher final input level to drive the capstan 31 at a higher speed, even though the final voltage level of the ramp output from the amplifier 93 remains the same. Closing of the switch 109*b* connects the capacitor 112 in parallel with the capacitor 94 to lessen the slope of the ramp output (as previously explained) to permit the lower rate of acceleration and deceleration when operating to or from the higher search and winding speeds. Closure of the switch 109*c* causes either polarity of output from the amplifier 93 to be applied to the relay driver circuit 108 to hold the relay operated switches closed.

The set output from the high speed flip-flop 106 is also applied through a delay 107 to enable the AND gate 104 to pass the pulse from the head 101 when it occurs. An inverter 114 also receives the set output from the high speed flip-flop 106, and its inverted output is applied to disable the AND gate 103 to prevent passage of the pulse from the advance head 101. The output from the AND gate 103 is coupled to the set input terminal of the direction flip-flop 91 whereas the output from the AND gate 104 is coupled to the reset output of the direction flip-flop 91.

The operation of the high speed search circuitry may best be understood by considering typical operational sequences which are carried out both in the forward and reverse search modes. Initially, the flip-flops 85, 86, and 106 are in their reset states while the direction flip-flop 91 is in the set state. Now assuming that a high speed reverse search mode is to be initiated, a high speed signal is delivered to the high speed flip-flop 106 and a reverse signal is applied to the reverse flip-flop 86 to place both in the set state. The set output from the high speed flip-flop 106 operates the relay driver circuit 108 thereby closing the associated relay switches. Also the set from the high speed flip-flop 106 output enables the AND gate 104 and disables the AND gate 103. The tape 11 is then accelerated at the slower rate provided by closure of the relay switches to the high tape speed at which the search is to be carried out. When the desired position mark or other data indicator is encountered by the head 101, a pulse is delivered to the input of the AND gates 103 and 104 and is also used to reset the high speed flip-flop 106. A delay 107 prevents the switching of the high speed flip-flop 106 from immediately disabling the AND gate 104 so that the pulse from the head 101 may be applied to reset the direction flip-flop 91.

The resulting reset output from the direction flip-flop 91 enables the AND gates 87 and 89 to pass the set outputs from the forward and reverse flip-flops 85 and 86. Previously, the set output from the direction flip-flop 91 enabled the AND gates 88 and 90 to pass the reset outputs from the forward and reverse flip-flops 85 and 86, due to the fact that the forward flip-flop 85 was in the reset state and the reverse flip-flop 86 was in the set state. Since the outputs of the forward and reverse flip-flops 85 and 86 are complementary, that is, of opposite polarity, the resetting of the direction flip-flop 91 causes the polarity of the signal delivered to the amplifier 93 to be reversed. Accordingly, the capacitors 94 and 112 start discharging at the constant slower rate toward zero thereby causing the capstan 31 to slow down. As the capstan speed approaches zero, the output from the amplifier 93 is no longer sufficient to operate the relay, and the formerly closed relay contacts 109*a*, 109*b* and 109*c* open. This permits the system to then accelerate at the high rate to the slower operating speed used for reading the tape 11 in the forward direction.

Subsequently, the tape 11 travels in the forward direction at the reading speed until the head 101 again detects the position mark on the tape, thereby delivering a pulse through the now enabled AND gate 103 to reset the forward and reverse flip-flops 85 and 86 and set the direction flip-flop 91. The setting of the direction flip-flop 91 disables the AND gates 87 and 89 and opens the AND gates 88 and 90. The forward and reverse flip-flops 85 and 86, which have now been reset, deliver equal reset outputs of opposite polarity through the enabled AND gates 88 and 90 which cancel thereby resulting in a zero input signal to the amplifier 93. This causes the capstan 31 to decelerate and stop quickly at the position mark. The located information may then be read in the normal manner by applying a forward command signal to set the forward flip-flop 85.

If the high speed search is to be carried out in a forward direction, the following sequence of operation obtains. Initially, the direction flip-flop 91 is in the set state thereby enabling the AND gates 88 and 90 to pass the reset outputs from the forward and reverse flip-flops 85 and 86. A high speed input signal is applied to set the high speed flip-flop 106 thereby actuating the relay driver circuit and enabling the AND gate 104. Also, a forward signal is applied to set the forward flip-flop 85 so that its reset output signal is no longer applied through the enabled AND gate 88. The system accelerates at the slower rate in the forward direction to reach the high tape speed used for the search. When the position mark on the tape passes the head 101, a pulse is delivered through the AND gate 104 to reset the direction flip-flop 91 thereby reversing the polarity of the signal applied to the amplifier 93 causing the capstan to slow down. Also the high speed flip-flop 106 is reset by the pulse from the advance head. When the output signal from the amplifier 93 has dropped to a low enough level, the relay driver circuit 108 is no longer actuated and the relay switch is opened. Accordingly, the tape 11 is slowed, stopped and then accelerates to normal speed in the reverse direction until the position mark is again detected. At that time, the output from AND gate 103 sets the direction flip-flop 91 and resets the forward flip-flop 85. The complementary outputs through the now enabled AND gates 88 and 90 cancel, and the tape stops. The located data man then be read by applying a forward command signal to the forward flip-flop 85.

Alternatively, the logic circuits in conjunction with an advance position mark detector may be arranged to slow the system to normal reading speed before the required location reaches the normal read head.

Figure 4:
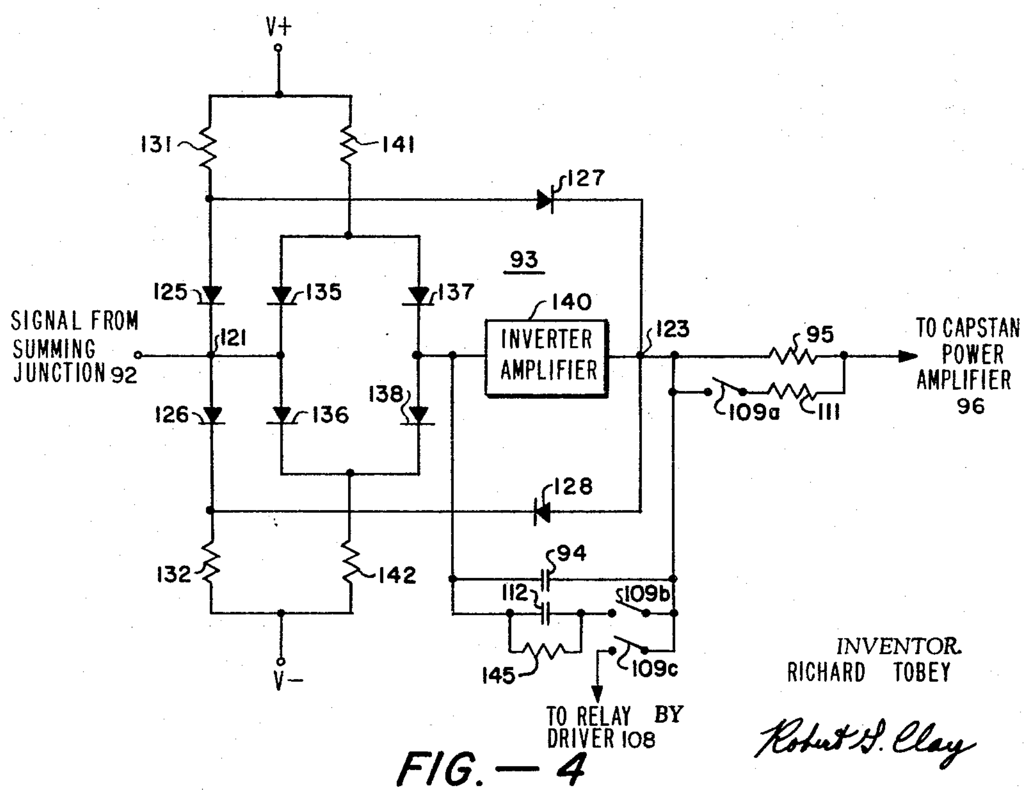
FIG. 4 is a detailed circuit diagram of a ramp generator which may be utilized in the control circuits of systems in accordance with the invention.

Referring now to FIG. 4, there is illustrated the combination of a unique combination of current limiter and amplifier 93 with the associated circuitry which is particularly useful in forming a ramp function generator in accordance with the invention. Certain elements illustrated herein are also illustrated in FIG. 3, and therefore bear the same reference numerals. Generally, the amplifier 93 receives the signal from the summing junction 92 at an input terminal 121 and produces a ramp function output signal of opposite polarity at an output terminal 123. A first set of four diodes 125, 126, 127 and 128 are connected in a bridge arrangement between the input and output terminals 121 and 123 so that with zero input to the summing junction 92 the output of the amplifier 93 is clamped at zero or moves towards zero at a constant rate.

Opposite polarity voltage sources V+ and V− are connected through respective equal resistors 131 and 132 to provide a forward bias voltage to opposite terminals of the bridge arrangement of the four diodes 125–128. More specifically, the diodes 125 and 126 are connected in the forward conducting direction with respect to the bias sources with one on either side of the input terminal 121, and the diodes 127 and 128 are also connected in a forward conducting direction with respect to the bias sources with one on either side of the output terminal 123 of the amplifier 93. However, as will be later explained in more detail in connection with the operation of the circuit, this bridge circuit cooperates in a unique fashion to provide a ramp function output in addition to providing a desirable clamping operation to the amplifier 93.

Another bridge arrangement of four diodes 135, 136, 137 and 138 is connected between the input terminals 121 and the input to a conventional inverter amplifier 140. This bridge arrangement of diodes 135–138 is biased in the forward conducting direction by the voltage sources V+ and V− through separate equal resistors 141 and 142, which have a resistance greater than resistors 131 and 132. This second bridge arrangement provides a constant current output to the input of the amplifier 140 whenever the input signal from the summing junction 92 exceeds a given level, defined by the values of the resistors 141 and 142 in conjunction with the voltages V+ and V−.

The output terminal 123 of the amplifier circuit 93 is connected through the resistor 95 to provide an input signal to the capstan power amplifier 96 to drive the capstan 31 at a speed proportional to the magnitude of the input. The output terminal 123 is also connected through the charging capacitor 94 to the input of the inverter amplifier 140, which is maintained at all times near ground potential.

The operation of this system may best be understood by reference to a typical operating sequence wherein the tape is to be started in one direction and then stopped. Initially, it is assumed that a zero potential exists both at the input terminal 121 and the output terminal 123 of the amplifier 93. In this condition, substantially equal currents flow in the forward direction through the diodes 125–128, and the input terminal 121 is thereby coupled to the otuput terminal 123 through the forwardly conducting diode. Likewise, substantially equal currents flow through the diodes 135–138, and the input terminal 121 is coupled through the forwardly conducting diodes to the input of the inverter amplifier 140.

Assume now that a negative input signal is obtained from the summing junction 92 and applied to the input terminal 121 to command the tape 11 to go forward. The magnitude of this signal is in excess of the sum of the currents normally flowing through resistors 131 and 141, that is, it is of sufficient magnitude to produce a current flow through the diodes 125 and 135 which is in excess of the normal current flow when the input terminal 121 is at zero potential. The forward input command signal thus lowers the potential of the input terminal 121, thereby back biasing the diode 136 to non-conduction. The current through the resistor 142 flows through diode 138 from the input of amplifier 140 and capacitor 94. The output of the amplifier 140 moves positive to back bias the diodes 126 and 127 so that the input terminal 121 is now decoupled from the output terminal 123 to permit amplification of the signal.

The magnitude of the negative command signal from the summing junction 92 is likewise sufficient to cause the diodes 136 and 137 of the other bridge arrangement to cut off by virtue of the increased voltage drop across the resistor 141. Accordingly, all of the current flowing through the resistor 142 from the V− source flows through the diode 138 to the input of the inverter amplifier 140, which is at all times maintained substantially at zero potential. Therefore, the additional bridge arrangement of diodes 135–138 with the fixed resistors 141 and 142 of equal value operates as a current limiter circuit to provide a constant input to the inverter amplifier 140 so long as the input is above a certain level.

The inverter amplifier 140 may be any conventional circuit for receiving a current input. For example, such an amplifier circuit utilizing transistors is described in detail in applicant's above-mentioned patent application, wherein a differential amplifier first stage is employed with a push-pull output stage. The constant input current to the inverter amplifier 140 causes a constant output current flow to charge the integrating capacitor 94 in the opposite direction at a constant rate, thereby causing the voltage at the output terminal 123 to build up in ramp fashion. Further charging of the integrating capacitor circuit ceases when the voltage at the output terminal 123 equals the supply voltage employed at the output stage of the inverter amplifier 140. For convenience, this supply voltage to the inverter amplifier 140 may be derived directly from the V+ and V− potential sources.

After charging of the integrating capacitor 94, the output voltage remains constant as long as the forward command signal is applied from the summing junction 92, thus delivering a constant current flow through the resistor 95 to drive the capstan 31 and the tape 11 at a constant speed. However, when the negative forward command signal is removed from the input terminal 121, the constant current amplifier circuit 93 functions to discharge the integrating capacitor 94 gradually at the same rate at which it was charged in the following manner. With the negative input signal removed, zero current flows into the summing junction while the output terminal 123 is at the maximum positive potential since it cannot be discharged instantaneously. The diodes 125 and 128 are forward biased while the diodes 126 and 127 are reverse biased. The current through resistor 131 flows through the diodes 125 and 136, and reverse biases diodes 135 and 138. Thus the current through resistor 141 flows via diode 137 into the input of the amplifier 140 and capacitor 94. The voltage at the output of the amplifier 140 moves at a constant rate towards zero until the circuit reaches the equilibrium condition with the output terminal 123 clamped to the input terminal 121.

A similar operation obtains when a positive reverse command signal is applied initially from the summing junction 92 and later removed except that the opposite diodes react in the manner described. Similarly, when a positive reverse command signal is applied immediately after a negative forward command signal, the system operates as described above except that the integrating capacitor 94 continues to be discharged at a constant rate until reaching the maximum negative potential instead of stopping at zero. Closing of the relay contacts 109*a* and 109*b* operates as previously described herein to increase the input signal to the capstan power amplifier 96 and decrease the charging rate of the integrating circuit. If desired, a resistor 145 may be connected across the additional integrating capacitor 112 to insure that, when the contacts 109*b* are open, any remaining potential on the capacitor 112 is discharged before the contacts are again closed.

It is now apparent that the invention provides a web transport system that takes account of the fact that a material such as magnetic tapes can only withstand a limited amount of stress and strain caused by sudden changes in speed or direction of travel. The system of the invention provides outstanding operational capabilities while still embodying means for substantially reducing tape breakage without detracting from the capabilities of the system.

Although a preferred embodiment of the invention has been illustrated and described, it is apparent that many changes and modifications can be made by one skilled in the art without departing from the true scope and spirit of the invention.

What is claimed is:

1. A web transport system for variable speed programmed operation comprising: at least one drive capstan for driving the web material; means for driving said capstan at a speed proportional to the magnitude of a control signal; and control means for providing said control signal including a ramp generator having a first selectable time constant for controlling acceleration and deceleration of said drive capstan at one rate between a stopped condition and a low speed and a second selectable time constant for controlling acceleration and deceleration of said drive capstan at a slower rate to and from a higher speed.

2. A web transport system for variable speed programmed operation comprising: at least one drive capstan for driving the web material; means for driving said capstan at a speed proportional to a drive signal; control means for generating said drive signal as a predetermined ramp function having a first time constant for controlling acceleration and deceleration of said drive capstan at one rate between a low speed and a stopped condition and a second selectable time constant for controlling acceleration and deceleration of said drive capstan at a slower rate to and from a higher speed.

3. A web transport system for variable speed programmed operation comprising: at least one drive capstan for driving web material; servo means for controlling the speed of said driving capstan in accordance with a control signal including signal means for generating said control signal to control the acceleration and deceleration of said drive capstan at one rate when accelerating and decelerating between low speeds in opposite directions, and controlling acceleration and deceleration of said drive capstan at a slower rate when accelerating to a higher speed or decelerating from said higher speed, respectively.

4. The web transport means defined by claim 3, wherein said signal means includes a constant input amplifier and an integrating means for integrating the constant input to produce a control signal having a ramp function signal characteristic, said integrating means having selectable first and second integrating rates.

5. A variable speed, intermittent and bidirectional movement transport system for web material comprising: supply and takeup reels for said web material; a single drive capstan positioned between said supply and takeup reels in continual engagement with said web material; buffer means for providing a loop storage of the web material on either side of said capstan between said reels; control means for controlling the speed and the direction of said drive capstan including means for controlling acceleration and deceleration of said drive capstan at a first rate when accelerating and decelerating between low speeds in either direction, and controlling acceleration and deceleration of said drive capstan at a slower rate when accelerating and decelerating to and from a high speed.

6. The transport system defined by claim 5, wherein said control means includes a fixed output amplifier, means for integrating the output of said amplifier at one of two selectable rates to provide a control signal, and servo means responsive to the magnitude of the control signal for driving the drive capstan at a proportional speed.

7. In a tape transport system having a tape drive capstan and rotatable means for driving said capstan at a first final speed and at a second higher final speed, control means comprising: means for providing a first signal for driving said capstan at said first final speed; means for providing a second signal for driving said capstan at said second higher final speed; and ramp function generating means having selectable first and second time constants for applying said first and second signals to said rotatable means at different gradual rates.

8. The control means defined by claim 7, wherein said second signal is applied to said rotatable means at a slower rate than said first signal is applied.

9. In a tape transport system having a tape drive capstan and rotatable means for driving said capstan at one speed and at a higher speed, control means comprising: means for providing a first signal for driving said capstan at said one speed; means for providing a second signal for driving said capstan at said higher speed; and means for applying and removing said first signal to and from said rotatable means at one rate, and applying and removing said second signal to and from said rotatable means at another rate.

10. The control means defined by claim 9, wherein said one rate is faster than said another rate.

11. The control means defined by claim 9, wherein said means for applying and removing said first and second signals includes an integrating means for generating said first and second signals.

12. The control means defined by claim 11, wherein said integrating means has a variable time constant.

13. In a tape transport system having a tape drive capstan means for driving a tape at one speed and at a higher speed, control means comprising: amplifier means for providing an output signal at a fixed magnitude in response to an input signal; means for providing an input signal to said amplifier means; means for integrating the output signal to one of two selected rates to provide a ramp function control signal; means responsive to a switching signal for choosing one of said selected rates; and capstan drive means for driving said capstan at a speed proportional to the magnitude of said control signal.

14. In a variable speed, intermittent movement tape transport system having a single drive capstan positioned between tape supply and tape takeup reels and in continual engagement with a tape, a drive and control system comprising: means for providing a first signal for driving said drive capstan in one direction at one speed; means for providing a second signal for driving said drive capstan in a reverse direction at said one speed; means for providing a third signal for driving said drive capstan in said one direction at a second speed higher than said one speed; means for driving said capstan at a speed proportional to the magnitude of a control signal; means responsive to said first, second and third signals for providing a constant input current; means for integrating said constant input current and providing a control signal to said drive means, said integrating means having first and second selectable time constants; and means responsive only to said third signal for selecting said second time constant to apply said control signal at a faster rate.

15. The system defined by claim 14, further comprising means interposed between said integrating means and said driving means and having first and second selectable gain characteristics, said interposed means being responsive only to said third signal for selecting said first gain characteristic to provide a greater magnitude control signal to said driving means.

16. The system defined by claim 15, wherein said means interposed between said integrating and said driving means comprises a variable resistance circuit having selectable first and second resistance values.

17. The system defined by claim 16, wherein said integrating means comprises first and second integrating capacitors and said selecting means comprises a relay for connecting said first integrating capacitor in parallel with said second integrating capacitor.

18. The system defined by claim 17, wherein said relay has holding contacts, whereby said relay maintains said second integrating capacitor in parallel with said first integrating capacitor at least as long as said control signal is in excess of a predetermined level.

19. In a tape transport system having supply and take-up reel means for the relatively slow accelerational capacities, a capstan tape driving means in a tape path between the reel means with a relatively fast accelerational capacity, and buffer means for providing a tape loop storage in the tape path on either side of the capstan tape driving means to compensate for the relatively slower accelerational capacity of the reel means, a control circuit for driving the tape bidirectionally at low normal speeds between the reel means and for achieving a high speed rewind operation comprising: a signal summing circuit; a source for selectively providing first, second and third command signals to said summing circuit, each of said command signals producing an output signal of a predetermined magnitude from said summing circuit, said first command signal having a polarity opposite to that of said second and third command signals; ramp function generator means responsive to said output signals for providing a control signal, said ramp function generator means including a constant output amplifier, an integrating circuit for integrating the output from said constant current amplifier and having switchable short and long integrating time constants, and a resistive output circuit having switchable high and low resistance values; means for driving the capstan driving means at a speed proportional to the magnitude of the control signal; and, switching means for normally maintaining said short integrating time constant and said high resistance value to provide a high accelerational rate for said capstan between said low normal speeds and for alternatively providing said long time constant and said low resistance value in response to said third signal to produce a low accelerational rate for said capstan tape driving means for achieving high speed rewind, said low accelerational rate being within the accelerational capacity of the supply and takeup reels.

20. The control circuit of claim 19 further comprising marking means for defining an end of rewind position on the tape, means for sensing the marking means to provide said first command signal from said source to said summing circuit to cancel the output signal produced by said third command signal thereby decelerating said capstan tape driving means towards a stop condition, and wherein said switching means includes means responsive to the drop in the magnitude of the control signal for disconnecting said third command signal from said summing circuit when the capstan tape driving means has decelerated below normal speed, thereby permitting the capstan driving means to be accelerated at the high accelerational rate to normal speed in the opposite direction.

21. The control circuit of claim 20 wherein said sensing means includes means for stopping said first command signal after the tape has advanced in the forward direction at said normal speed to the end of rewind position.

22. In a tape transport system having capstan means for driving the tape, a control device for driving the tape bidirectionally both at low data transfer speeds and high data search speeds comprising a forward command means for providing an output signal of a first polarity; a reverse command means for providing an output signal of a second polarity; a summing means for combining the output from said forward and reverse command means; a gating arrangement responsive to gating signals for reversing the polarity of the signals provided from said forward and reverse command means to said summing means; ramp function generator means coupled to receive an output signal from said summing means which is indicative of the combination of the signals from said forward and reverse command means for providing a control signal of constant magnitude and of a polarity indicative of the polarity of said output signals; an integrating circuit for integrating the control signal until it reaches a selected level, said integrating circuit having selectable short and long integrating time constants, and a resistive output circuit having selectable high and low resistance values to provide a driving current to the capstan means, said capstan means being driven at a speed proportional to the magnitude of said driving current and in a direction indicated by the polarity of the driving current; means for providing a high speed command signal switching means normally maintaining said short integrating time constant and said high resistance value to provide a high accelerational rate for said capstan means between the low data transfer speeds, said switching means being responsive to said high speed command signal for providing said long time constant and said low resistance value to produce a low accelerational rate for said capstan means for accelerating to and decelerating from high speed search operation; and sensing means for sensing a desired point on the tape and providing a gating signal to said gating means to reverse the polarity of said output signal.

23. The control device of claim 22 wherein said switching means includes means responsive to the magnitude of the driving current for maintaining said long time constant and said low resistance value whenever said driving current is above a certain magnitude, whereby the reversal of polarity of the output signal causes said capstan means to decelerate at a low rate from the high speed search direction and accelerate in the opposite direction at the high rate to a low data transfer speed.

24. The control device of claim 23 wherein said switching means further includes means responsive to a second gating signal from said sensing means to remove the command signals from said forward and reverse command signal sources, when said desired point is again sensed.

25. A tape transport system having a controlled circuit for achieving bidirectional high speed search and bidirectional data transfer speeds comprising a directional means providing forward and reverse command signals of opposite polarity, a high speed command signal means, a ramp function generator means for providing a ramp function output signal having a short rise time and a low final level and including switching means responsive to said high speed command signals for providing another ramp function output signal having a long rise time and a high final level, and capstan drive means coupled to receive said output signals to drive the tape at a speed proportional to the instantaneous magnitude of the output signals.

26. The tape transport system of claim 25 further including sensing means for locating a desired point on the tape and providing a switching signal indicative thereof, said directional means being responsive to said pulse signal for reversing the polarity of the directional command signal, and wherein said switching means includes means responsive to the magnitude of the output drive signal to restore said ramp function generating means to its normal condition to provide a ramp function output with a short rise time and a small final output level when said output drive signal has been reduced to approximately zero.

27. The control circuit of claim 19 wherein the output of said constant output amplifier has a polarity opposite the polarity of said output signals from said summing circuit, said control circuit further including current limiter means responsive to said output signal from said summing circuit above a predetermined level for providing an input current of a constant magnitude and of the same polarity as said output signals to the input of said constant output amplifier, said current limiter means having a terminal for receiving said output signals, and means coupling said terminal to the constant output amplifier output whenever the voltage of said output signals is below said predetermined level.

References Cited by the Examiner

UNITED STATES PATENTS

| | | | |
|---|---|---|---|
| 2,497,766 | 2/1950 | Hadfield | 328—178 |
| 2,724,051 | 11/1955 | Rajchman et al. | 328—178 |
| 2,867,791 | 1/1959 | Goldberg et al. | 340—174.1 |
| 2,954,415 | 9/1960 | Gilson | 242—55.12 |
| 2,954,546 | 9/1960 | Burns et al. | 340—174.1 |
| 3,137,453 | 6/1964 | Wooldridge | 242—55.12 |
| 3,206,133 | 9/1965 | Forster et al. | 242—55.12 |

FRANK J. COHEN, *Primary Examiner.*

G. F. MAUTZ, *Examiner.*

UNITED STATES PATENT AND TRADEMARK OFFICE
CERTIFICATE OF CORRECTION

PATENT NO. : 3,318,545

DATED : May 9, 1967

INVENTOR(S) : Richard Tobey

It is certified that error appears in the above-identified patent and that said Letters Patent are hereby corrected as shown below:

Col. 13, claim 13, line 30, between "signal" and "one", "to" should read --at--; claim 14, line 53, "faster" should read --slower--. In Fig. 2, add a dot to the intersection of the wire extending from the output of signal amplifier 65 to contact 68c with the wire extending between capacitor 73 and contact 68d to indicate the electrical connection of the two wires at the dot.

Signed and Sealed this

*twentieth* Day of *April 1976*

[SEAL]

*Attest:*

RUTH C. MASON
*Attesting Officer*

C. MARSHALL DANN
*Commissioner of Patents and Trademarks*